United States Patent [19]

Matsumoto et al.

[11] Patent Number: 5,577,338
[45] Date of Patent: Nov. 26, 1996

[54] HOLLOW COLLAPSIBLE FISHING ROD WITH FISHLINE GUIDE

[75] Inventors: Kiyohiko Matsumoto; Toshihiko Yasui, both of Osaka, Japan

[73] Assignee: Shimano, Inc., Osaka, Japan

[21] Appl. No.: 363,078

[22] Filed: Dec. 23, 1994

[30] Foreign Application Priority Data

Apr. 19, 1994 [JP] Japan ................... 6-080102

[51] Int. Cl.⁶ .................................. A01K 87/04
[52] U.S. Cl. ............................. 43/18.1; 43/24
[58] Field of Search ............... 43/18.1, 23, 24, 43/18.5

[56] References Cited

U.S. PATENT DOCUMENTS

| | | | |
|---|---|---|---|
| 2,776,516 | 1/1957 | Jennette | 43/24 |
| 2,777,239 | 1/1957 | Cushman | 43/18.1 |
| 4,174,583 | 11/1979 | Ohmura | 43/24 |
| 4,183,163 | 1/1980 | Reimer | 43/24 |
| 5,406,736 | 4/1995 | Park | 43/24 |

FOREIGN PATENT DOCUMENTS

| | | |
|---|---|---|
| 980938 | 5/1951 | France . |
| 1565620 | 5/1969 | France ................... 43/18.1 |
| 2539582 | 7/1984 | France . |
| 2625409 | 7/1989 | France . |
| 197803 | 3/1978 | Germany ................. 43/24 |
| 254172 | 12/1948 | Switzerland . |
| 1259820 | 1/1972 | United Kingdom . |

*Primary Examiner*—Kurt Rowan
*Assistant Examiner*—Jeanne M. Elpel
*Attorney, Agent, or Firm*—Shinjyu Office of Patent Attorneys

[57] ABSTRACT

A fishing rod has rod a plurality of sections (1, 2 and 3), a fishline guide (6), and fishline guide rings (9a–9e). The rod sections include an inner passage (P) through which fishline is to extend, a reel mount to which a reel is attached, and a fishline guide hole (2a). The fishline guide (6) is placed between the reel mount (5) and the fishline guide hole (2a) for guiding the fishline (L) to the fishline guide hole (2a). The fishline guide rings (9a–9e) are fitted to a guide portion of the fishline guide (6), a rim of an opening of the fishline guide hole (2a), and a rim of a rear opening of the inner passage (P) close to the fishline guide hole.

10 Claims, 5 Drawing Sheets

5,577,338

HOLLOW COLLAPSIBLE FISHING ROD WITH FISHLINE GUIDE

BACKGROUND OF THE INVENTION

1. Field of the Invention

The present invention relates to a collapsible fishing rod, and more particularly, it relates to a hollow collapsible fishing rod which has a fishline guide for guiding a fishline from a reel into a fishline passage defined within the hollow fishing rod.

2. Description of the Related Art

Hollow fishing rods where a fishline extends through a portion the hollow fishing rod are known. Typically in such a rod, a fishline passage is defined within the hollow portion of the rod and a hole near a butt section of the rod allows the fishline to extend out of the hollow interior of the rod where it can be wound and unwound from a reel attached to the butt section of the rod. While fishing with such a rod, the fishline is cast and wound in from the reel repeatedly.

Usually, fishing rod reels include a mechanism which causes the fishline to oscillate as it is being wound and unwound from the reel, so that the fishline is wound up evenly on the reel. During the casting and winding process, the fishline makes repeated contact with the rim of the hole as is passes back and forth from the reel to the hole in the rod due to the oscillation of the reel mechanism. The oscillating fishline rubs against the rim of the hole and creates friction resistance. Consequently, the friction resistance interferes with smooth winding and unwinding of the fishline.

Some reels are what is known as a spinning reel. A portion of the reel mechanism rotates or spins about an axis that generally coincides with the movement of the fishline as it winds and unwinds off the reel. In this instance, the fishline, due to the spinning of the reel, spirals as it is wound and unwound from the reel. Consequently, the fishline likewise contacts the rim of the hole in the rod. Further, when fishline is unwound from a spinning reel, it may come off the reel with curly or curved shape. The associated uneven contour of the fishline may also cause the fishline to rub against the rim of the hole in the rod causing friction resistance. The friction resistance interferes with smooth unwinding the fishline.

SUMMARY OF THE INVENTION

One object of the present invention to reduce friction resistance on fishline at a fishline guide hole for smoothly winding and unwinding the fishline.

In one aspect of the present invention, a hollow collapsible fishing rod includes a butt portion having at least a partially hollow interior open at a fore end, a reel mount portion for retaining a reel near a hind end thereof, and a fishline guide aperture formed adjacent the fore end of the butt portion. The rod also includes a hollow tip portion that is telescopically mounted to the butt portion defining a fishline inner passage that extends from the tip portion to the butt portion hollow interior adjacent to the fishline guide aperture. A fishline guide provided between the reel mount portion and the fishline guide aperture, wherein a fishline is extendable from the reel mounted portion, through the fishline guide and the fishline guide aperture, into the hollow extent of the butt portion, and through the inner passage of the hollow tip portion. A guide fitting is provided in the fishline guide, a guide fitting is provided in the fishline guide aperture, and a guide fitting is provided in the hind end opening of the hollow tip portion. Preferably, the guide fittings are made of a rigid ceramic material.

The fishline guide aperture is formed such that casting and reeling a fishline passing between the fishline guide and the hind end opening of the hollow tip portion contacts neither fore nor hind portions of the fishline guide aperture.

The butt portion includes, in one embodiment, a hind butt section provided with the reel mount, and a telescoping fore butt section, telescopically extendable from and collapsible into the hind butt section. The fishline guide aperture is formed in the telescoping fore butt section. Further, the fishline guide is attached to the hind butt section.

In another embodiment, the fishline guide is attached to the telescoping fore butt section.

In another aspect of the present invention the fishing rod includes a main rod, a fishline guide, and a plurality of fishline guide rings. The main rod has an inner passage through which fishline is to extend, a reel mount to which a reel is attached, and a fishline guide hole formed before the reel mount for guiding the fishline from the reel on the reel mount to the inner passage. The fishline guide is placed between the reel mount and the fishline guide for guiding the fishline to the fishline guide hole. The fishline guide rings are fitted to a guide portion of the fishline guide, a rim of an opening of the fishline guide hole, and a rim of a rear opening of the inner passage close to the fishline guide hole.

According to the present invention, the fishline guide rings are fitted on to the rod to keep the portion of the fishline that is on the exterior of the rod, spaced apart from the rod. As a result, friction resistance on the fishline can be reduced. In addition to that, since the fishline guide is placed between the fishline guide hole and the reel mount, oscillation of the fishline is inhibited before the fishline is guided into the fishline guide hole or when it is drawn out of the fishline guide hole, and thus, the fishline no longer contacts the guide ring at the fishline guide hole. In this way, friction resistance on the fishline can be further reduced.

DETAILED DESCRIPTION OF THE PREFERRED EMBODIMENTS

Figure 1:
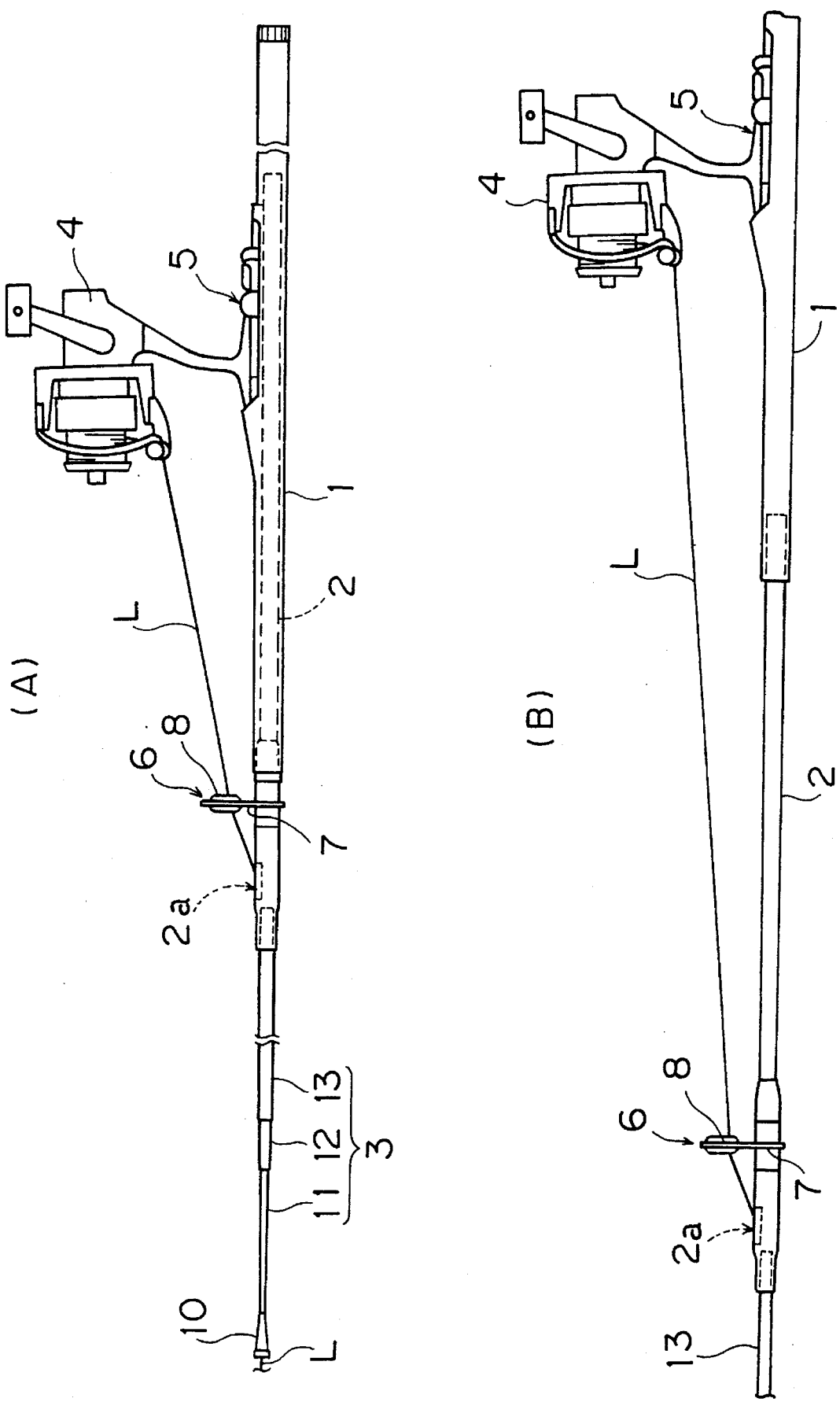
FIG. 1A is a fragmentary side elevation of a telescopic hollow fishing rod, shown partially collapsed, in accordance with a first embodiment of the present invention.
FIG. 1B is a fragmentary side elevation of the rod, similar to FIG. 1A, shown with a butt telescoping section fully extended.

These and other objects, features, aspects and advantages of the present invention will become more fully apparent from the following detailed description of the present invention when taken in conjunction with the accompanying drawings where like reference numerals denote corresponding parts throughout, in which a telescopic fishing rod, shown in FIGS. 1A and 1B, includes a hind butt section 1 having a telescoping butt section 2, and a telescopic tip assembly 3 having three telescoping sections. The telescopic tip assembly 3 includes a fore tip section 11 capped by a tip guide 10, a mid tip section 12, and a hind tip section 13, in order of increasing diameter.

Figure 2:
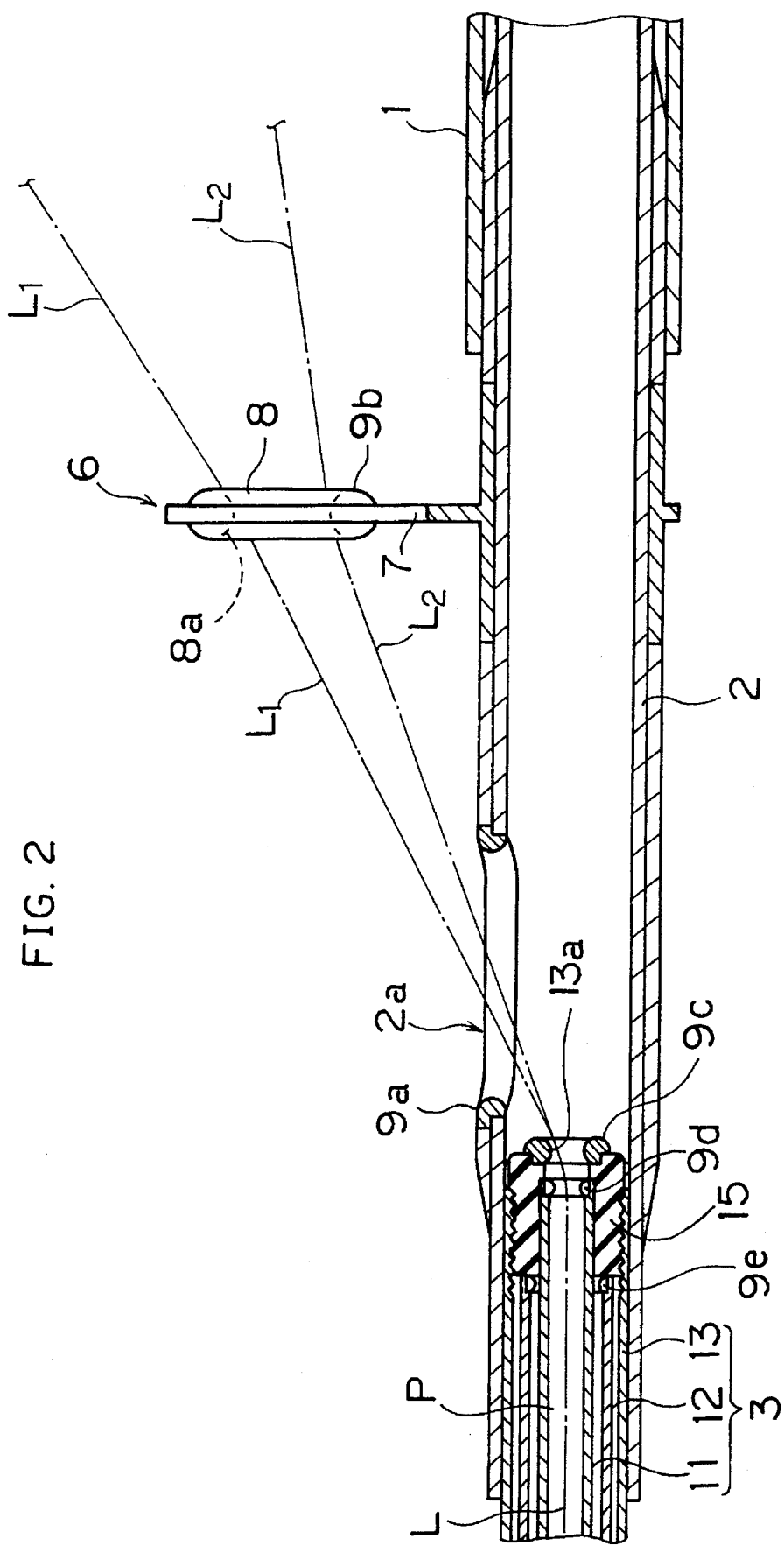
FIG. 2 is a fragmentary, part section, part elevation of the fishing rod as in FIGS. 1A and B, showing a portion of the rod having a fishline guide ring and a guide hole, wherein one portion of a tip section of the rod is fully extended and the remaining portions of the tip section are completely collapsed.

Referring to FIG. 2, the telescopic tip assembly 3 is shown fully extended with respect to the telescoping butt section 2, while the tip sections 11, 12 of the assembly 3 are fully collapsed into the hind tip section 13. The three tip sections 11, 12, and 13 define an interior passage P which serves as a fishline passage.

Returning to FIG. 1, a reel mount 5 provided on an exterior surface of the hind butt section 1, retains a reel 4. At an end of the telescoping butt section 2 opposite the reel mount 5 is a fishline guide hole 2a. A fishline L extends from the reel 4 into the interior passage P, via the guide hole 2a, as shown in FIG. 2. The guide hole 2a is provided with a grommet 9a mounted therein.

A fishline guide 6 is provided behind the fishline guide hole 2a. The fishline guide 6 comprises an upright portion 7, peripherally fixed to the telescoping butt section 2. The upright portion 7 supports a rigid grommet 9b mounted therein, having a guidehole 8. The grommet 9b guidehole 8 is formed with a curved rim surface 8a. Referring specifically to FIG. 2, rigid grommets 9a and 9b, preferably made of ceramic, are shown to rim the fishline guide hole 2a, and the guide hole 8 of the fishline guide 6, respectively.

A tubular plastic fitting 15 is screwed fixedly into a hind end of the hind tip section 13. A rigid grommet 9c is fitted into a hind opening of the tubular plastic fitting 15, defining a hind opening 13a in the tip section 13. When the tip assembly 3 is collapsed, a hind end of the fore tip section 11, into which a rigid grommet 9d is fitted, is seated within the fitting 15. Furthermore therein, a hind end of the mid tip section 12, into which a rigid grommet 9e is fitted, is seated on an interior rim of a fore end of the fitting 15.

The relative positions of the hind opening 13a of the hind tip section 13, the fishline guide hole 2a, and the fishline guide 6, are set within constraints for optimal performance of the hollow fishing rod in spin casting and reeling in fishline.

The phantom lines in FIG. 2 indicate the tracks $L_1$, $L_2$ of fishline L riding on uppermost and lowermost portions of the grommet 9b rimming the guide hole 8a, and on the uppermost portion of the grommet 9c in the hind opening 13a of the hind tip section 13, as the fishline travels through the fishline guide 6 while the line is reeled in or out. The tracks $L_1$, $L_2$ indicate that the reeling or casting fishline contacts neither the fore nor the hind portions of the grommet 9a rimming the fishline guide hole 2a due to the position of the grommet 9b and the guide 6.

The fishline guide 6 inhibits oscillation of the fishline in reeling in or casting out, reducing frictional drag on the fishline by preventing it from contacting the grommet 9a rimming the fishline guide hole 2a. Moreover, the rigid grommets are provided where the fishline regularly is in contact with the guide features of the rod, to reduce frictional drag further.

When the telescoping butt section 2 is fully extended from the rear butt section 1, for instance, when in use, the fishline guide 6 in this embodiment guides the fishline to prevent contact with the telescoping butt section 2, preventing the rod itself from hindering casting/reeling performance.

When threading fishline L from the reel 4 through the hollow of the fishing rod in this embodiment, the line L is introduced through the guide hole 2a into the passage P. While the tip assembly 3 is extended, and its telescoping component sections 11, 12 collapsed into the hind tip section 13, as illustrated in FIG. 2, the hind ends of the sections 11, 12, and 13 are positioned close to the fishline guide hole 2a. In this partially collapsed state, the respective openings or the grommets 9c, 9d, and 9e are easily and readily threaded with the fishline. After insertion of the fishline L into the portion 3, the rod can be fully extended and used without significant difficulty or worry about feeding the fishline through the extended rod, since feeding the fishline is easily accomplished when the rod is only partially extended.

Figure 3:
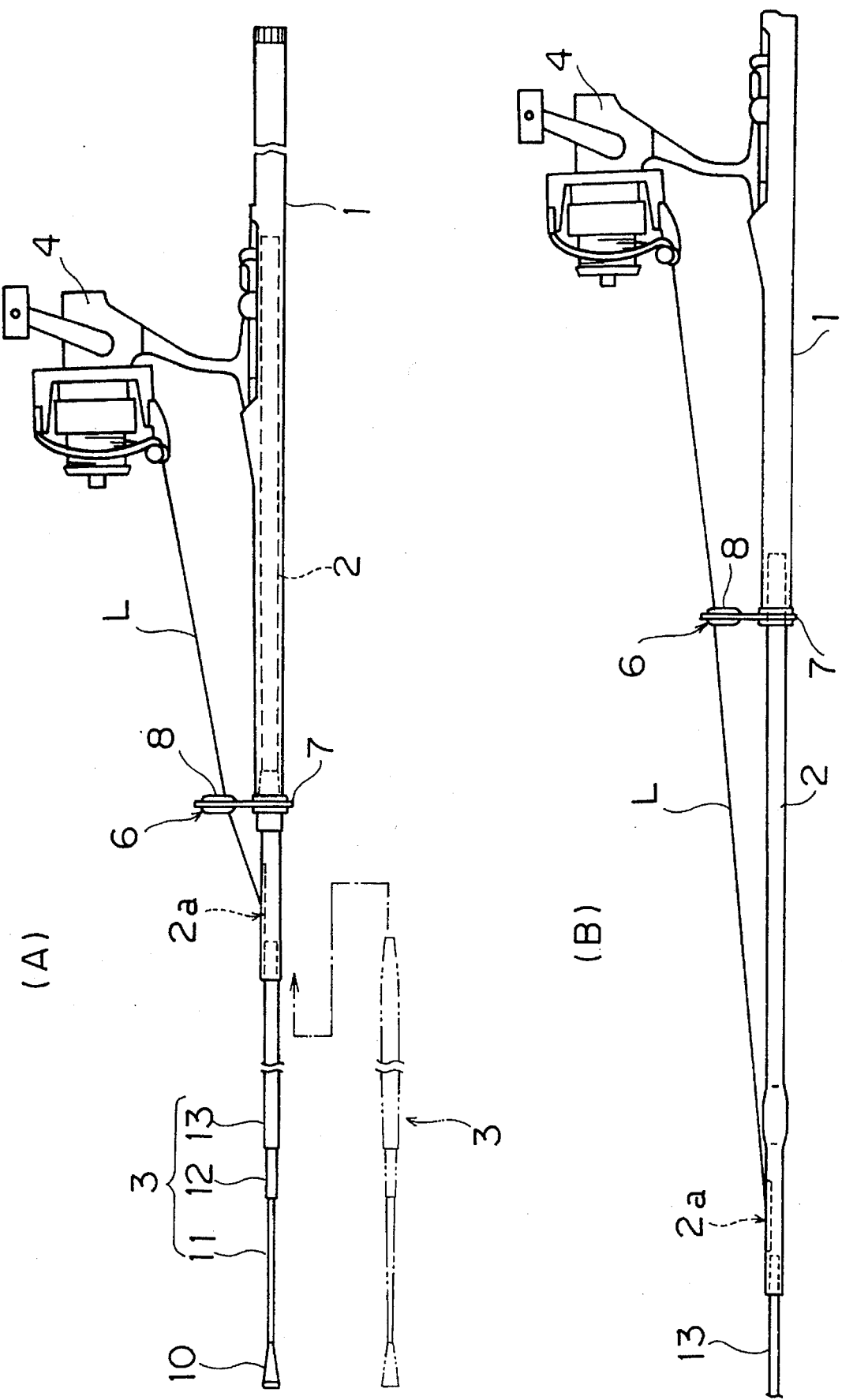
FIG. 3A is a fragmentary side elevation of an intra-line fishing rod, having separate telescopic tip and a telescopic butt portions, shown with the tip portion partially extended and butt portion collapsed, with the tip portion shown again in phantom removed from the butt portion, in accordance with another embodiment of the present invention.
FIG. 3B is a fragmentary side elevation of the rod, similar to FIG. A, shown with the butt telescoping section fully extended.

FIG. 3 illustrates another embodiment of the present invention, In this other embodiment, the fishline guide 6 is fixed to the hind butt section 1. A telescoping butt section 2 and an independent telescopic tip assembly 3 separable due to a releasable joint connection. The remaining features in the fishing rod configuration are similar to those of the above-described embodiment.

In this embodiment, the fishline guide 6 does not move with the telescoping butt section 2 when the latter is extended, such that the distance between the fishline guide 6 and the reel 4 remains fixed throughout the act of telescopically extending or collapsing the butt of the fishing rod.

Figure 4:
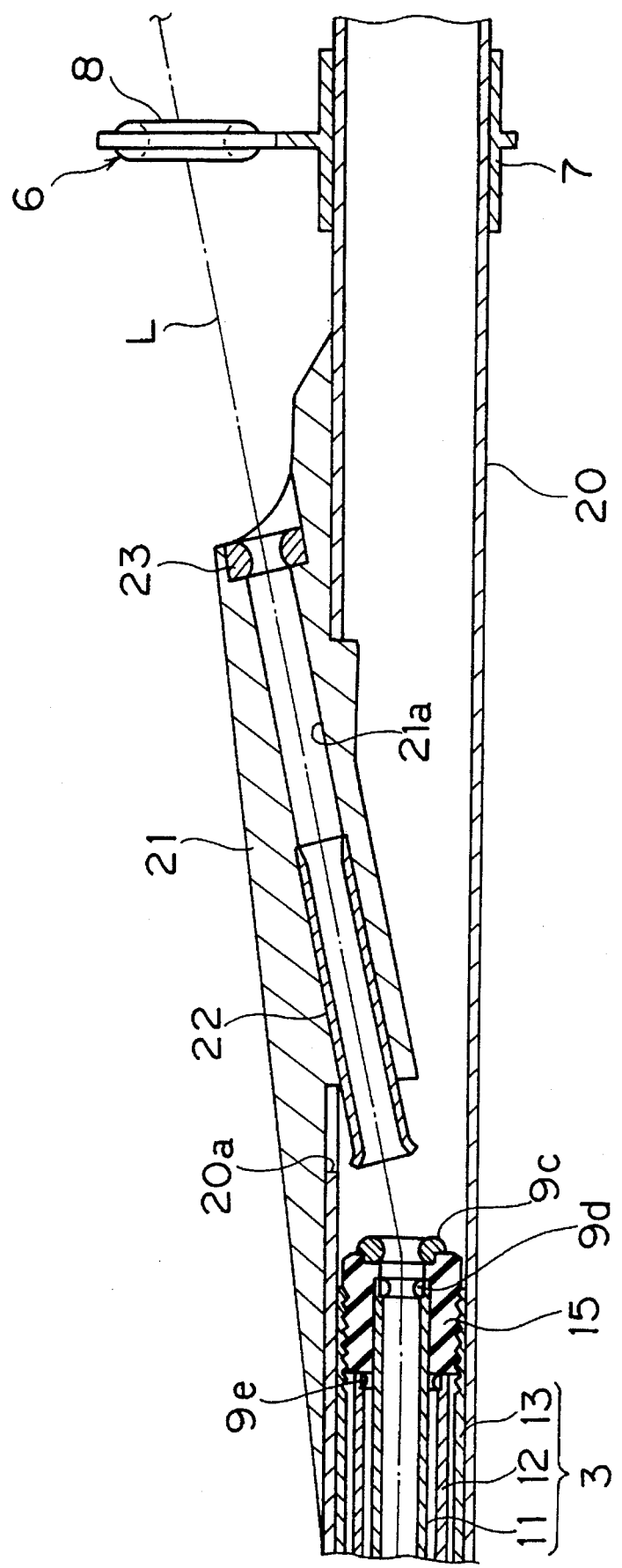
FIG. 4 is a fragmentary, part section, part elevation, similar to FIG. 2, of another embodiment of the present invention, showing a fishline guide ring and a modular guide tube, wherein the basal portion of the tip section is fully extended and the remainder of the tip sections are completely collapsed.

In still another embodiment of the present invention, shown in FIG. 4, a telescoping butt section 20 of a collapsible hollow fishing rod is formed with a top surface opening 20a. The butt section 20 is provided with a fishline guide element 21 fitted into the top-surface opening 20a. The guide element 21 is formed with a diagonal hole 21a. The diagonal hole 21a extends from the outer surface of the butt section 20 to the interior of the butt section 20 and provides a passage which allows a fishline L to extend from the hollow interior of the rod to a reel (not shown) attached to the butt section 20. A guide tube 22 is fitted into a forward portion of the diagonal hole 21a, protruding into the fishing rod hollow interior. A rigid grommet 23 is fitted into the exterior end of the hole 21a. The collapsible hollow fishing rod of this embodiment further includes a telescopic tip assembly 3 similar to that of the foregoing embodiments.

Figure 5:
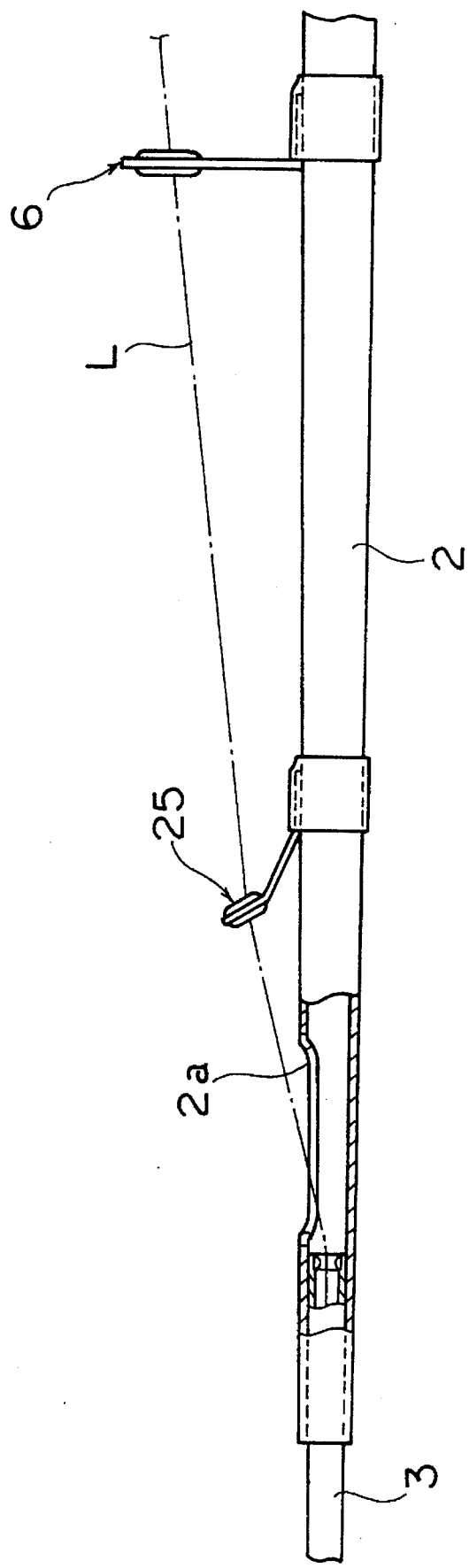
FIG. 5 is a fragmentary, part elevation, part section of a tip-to-butt joint portion of a fishing rod in accordance with still another embodiment of the present invention.

In yet another embodiment of the present invention, depicted in FIG. 5, a plurality of fishline guides are provided on the butt section 2 of a fishing rod. On the sectional, hollow fishing rod, a primary fishline guide 6 is mounted on the section 2 of the rod a distance behind fishline guide hole 2a. A secondary fishline guide 25 is situated between the guide hole 2a and the primary fishline guide 6, angled toward the guide hole 2a, and thus closer to the rod than the primary fishline guide 6. The configuration of a fishing rod according to this embodiment further prevents fishline from oscillating laterally in casting or reeling.

Each of the rigid grommets rimming the fishline guides/ holes in the embodiments as described above preferably will have an inner diameter of 2 mm or less.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A hollow collapsible fishing rod comprising:

a butt portion having a hind butt section which is at least partially hollow and includes a reel mount for retaining a reel, and a fore butt section which is at least partially hollow and is telescopically extendable from and collapsible into said hind butt section, and a fishline guide aperture formed in said fore butt section;

a telescopic hollow tip portion which includes a fore end and a hind end, said hind end mounted to said fore butt section, said telescopic hollow tip portion defining a fishline inner passage terminating at an opening in said hind end of said hollow tip portion;

a fishline guide provided between said reel mount portion and said fishline guide aperture, said fishline guide being attached to an exterior surface of said hind butt section;

wherein a fish line is extendable from said reel mounted portion, through said fishline guide and said fishline guide aperture, into the hollow extent of said fore butt section, and through the inner passage of said telescopic hollow tip portion; and a guide fitting provided in said fishline guide, a guide fitting provided in said fishline guide aperture, and a guide fitting provided in the hind end opening of said telescopic hollow tip portion.

2. A fishing rod according to claim 1, wherein said guide fittings are rigid ceramic grommets.

3. A hollow collapsible fishing rod, comprising:

a butt portion having a hind butt section which is at least partially hollow and includes a reel mount portion for retaining a reel, a fore butt section which is at least partially hollow and is telescopically extendable from and collapsible into said hind butt section, and a fishline guide aperture formed in said fore butt section;

a telescopic hollow tip portion which includes a fore end and a hind end, said hind end being mounted to said fore butt section, and said telescopic hollow tip portion defining a inner passage which terminates at an opening in said hind end of said hollow tip portion;

a fishline guide mounted to an exterior surface of said fore butt section and disposed between said reel mount portion and said fishline guide aperture, wherein a fishline is extendable from said reel mount portion, through said fishline guide and said fishline guide aperture, into the hollow extent of said fore butt portion, and through the inner passage of said telescopic hollow tip portion; and a guide fitting provided in said fishline guide, a guide fitting provided in said fishline guide aperture, and a guide fitting provided in the hind end opening of said telescopic hollow tip portion.

4. A fishing rod according to claim 3, wherein said guide fittings are rigid ceramic grommets.

5. A fishing rod according to claim 3, wherein said fishline guide aperture is formed such that casting and reeling a taut fishline passing between said fishline guide and the hind end opening of said hollow tip portion contacts neither fore nor hind portions of said fishline guide aperture.

6. A hollow collapsible fishing rod, comprising:

a butt portion having a hind butt section which is at least partially hollow and includes a reel mount portion for retaining a reel, a fore butt section which is detachably mounted to said hind butt section, and a fishline guide aperture formed in said fore butt section;

at least one hollow tip section, a hind end thereof being detachably mounted to said fore butt section, and said hollow tip section defining a inner passage which terminates at an opening in said hind end of said hollow tip portion; and a fishline guide mounted to an exterior surface of said fore butt section and disposed between said reel mount portion and said fishline guide aperture, wherein a fishline is extendable from said reel mount portion, through said fishline guide and then through said fishline guide aperture, into the hollow extent of said fore butt portion, and through the inner passage of said hollow tip portion;

wherein configuration of said fishline guide and said hind end opening of said hollow tip section are such that casting and reeling a taut fishline passing between said fishline guide and said hind end opening of said hollow tip portion prevents contact between said taut fishline and said fishline guide aperture.

7. A fishing rod according to claim 6, further comprising a guide fitting provided in said fishline guide, a guide fitting provided in said fishline guide aperture, and a guide fitting provided in the hind end opening of said hollow tip section, wherein said guide fittings are rigid ceramic grommets.

8. The fishing rod according to claim 6, wherein said hind end and a fore end of said hollow tip section are configured for telescopic movement with respect to one another.

9. A hollow collapsible fishing rod comprising:

a butt portion having a hind butt section which is at least partially hollow and includes reel mount portion for retaining a reel, a fore butt section which is detachably mounted to said hind butt section, and a fishline guide aperture formed in said fore butt section;

at least one hollow tip section, a hind end thereof being detachably mounted to said fore butt section, and said hollow tip section defining a inner passage which terminates at an opening in said hind end of said hollow tip section; and a fishline guide mounted to an exterior surface of said hind butt section and disposed between said reel mount portion and said fishline guide aperture, wherein a fishline is extendable from said reel mount portion, through said fishline guide and said fishline guide aperture, into the hollow extent of said fore butt portion, and through the inner passage of said hollow tip section; and a guide fitting provided in said fishline guide, a guide fitting provided in said fishline guide aperture, and a guide fitting provided in the hind end opening of said hollow tip section;

wherein configuration of said fishline guide and said hind opening of said hollow tip section are such that casting and reeling a taut fishline passing between said fishline guide and the hind end opening of said hollow tip section prevents contact between said taut fishline and said fishline guide aperture.

10. A fishing rod according to claim 9, wherein said guide fittings are rigid ceramic grommets.

* * * * *